US009942100B2

(12) United States Patent
Kanda et al.

(10) Patent No.: US 9,942,100 B2
(45) Date of Patent: Apr. 10, 2018

(54) COMPUTER PROGRAM PRODUCT, COMMUNICATION QUALITY ESTIMATION METHOD, INFORMATION PROCESSING APPARATUS, AND COMMUNICATION QUALITY ESTIMATION SYSTEM

(71) Applicants: Hiroyuki Kanda, Kanagawa (JP); Takahiro Asai, Kanagawa (JP)

(72) Inventors: Hiroyuki Kanda, Kanagawa (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 82 days.

(21) Appl. No.: 15/013,015

(22) Filed: Feb. 2, 2016

(65) Prior Publication Data
US 2016/0156524 A1 Jun. 2, 2016

Related U.S. Application Data

(63) Continuation of application No. PCT/JP2014/068507, filed on Jul. 10, 2014.

(30) Foreign Application Priority Data

Aug. 8, 2013 (JP) ................................. 2013-165114

(51) Int. Cl.
*H04L 12/26* (2006.01)
*H04L 12/24* (2006.01)
(Continued)

(52) U.S. Cl.
CPC .............. *H04L 41/12* (2013.01); *H04L 29/14* (2013.01); *H04L 43/0852* (2013.01);
(Continued)

(58) Field of Classification Search
CPC ....... H04L 1/0041; H04L 67/10; H04L 43/08; H04L 43/16; H04L 43/50; H04L 45/66;
(Continued)

(56) References Cited

U.S. PATENT DOCUMENTS

| 6,112,239 A | 8/2000 | Kenner et al. |
| 2003/0041165 A1* | 2/2003 | Spencer .............. H04L 12/1827 709/233 |

(Continued)

FOREIGN PATENT DOCUMENTS

| EP | 1 610 495 A1 | 12/2005 |
| JP | 2002-506543 | 2/2002 |

(Continued)

OTHER PUBLICATIONS

International Search Report dated Aug. 19, 2014 in PCT/JP2014/068507 Filed Jul. 10, 2014.

(Continued)

*Primary Examiner* — Michael J Moore, Jr.
(74) *Attorney, Agent, or Firm* — Oblon, McClelland, Maier & Neustadt, L.L.P.

(57) ABSTRACT

A computer program product includes a non-transitory computer-readable medium containing an information processing program. The program causes a computer to function as: a first communication control unit that calculates a first transfer rate by communicating with a communication quality check server via a network; a second communication control unit that calculates delay information about communication delay by communicating with the communication quality check server via the network; an estimation unit that estimates a second transfer rate based on the first transfer rate and the delay information, the second transfer rate being lower than the first transfer rate; and a display control unit that displays communication quality information about communication quality based on the first transfer rate and the second transfer rate on a display unit.

14 Claims, 12 Drawing Sheets

(51) Int. Cl.
 *H04L 29/14* (2006.01)
 *H04M 3/00* (2006.01)
 *H04M 3/56* (2006.01)
 *H04L 29/08* (2006.01)
 *H04L 29/06* (2006.01)

(52) U.S. Cl.
 CPC ...... *H04L 43/0864* (2013.01); *H04L 43/0894* (2013.01); *H04L 43/50* (2013.01); *H04L 65/80* (2013.01); *H04L 67/36* (2013.01); *H04M 3/00* (2013.01); *H04M 3/56* (2013.01); *H04L 43/045* (2013.01)

(58) Field of Classification Search
 CPC ..... H04L 65/4069; H04L 65/80; H04L 67/02; H04L 67/2842; H04L 69/16; H04L 12/44; H04L 12/4641; H04L 12/66; H04L 1/004
 See application file for complete search history.

(56) References Cited

U.S. PATENT DOCUMENTS

| | | | |
|---|---|---|---|
| 2004/0015582 A1* | 1/2004 | Pruthi | H04L 41/22 709/224 |
| 2004/0037223 A1* | 2/2004 | Harrison | H04L 45/50 370/235 |
| 2005/0220035 A1* | 10/2005 | Ling | H04L 41/5012 370/252 |
| 2005/0289395 A1* | 12/2005 | Katsuyama | H04L 41/0631 714/25 |
| 2007/0121511 A1* | 5/2007 | Morandin | H04L 1/187 370/235 |
| 2009/0164657 A1* | 6/2009 | Li | H04L 41/0896 709/233 |
| 2011/0255437 A1* | 10/2011 | Hama | H04L 1/1835 370/252 |
| 2012/0317278 A1 | 12/2012 | Tamaki et al. | |
| 2013/0117373 A1 | 5/2013 | Umehara | |
| 2013/0195119 A1* | 8/2013 | Huang | H04L 65/4092 370/468 |
| 2013/0298031 A1 | 11/2013 | Kanda et al. | |
| 2014/0129641 A1 | 5/2014 | Umehara | |
| 2014/0139687 A1* | 5/2014 | Adams | H04N 17/004 348/192 |
| 2014/0173102 A1* | 6/2014 | Kay | H04L 41/142 709/224 |
| 2014/0240448 A1 | 8/2014 | Kanda et al. | |
| 2014/0240770 A1 | 8/2014 | Hinohara et al. | |
| 2014/0244756 A1 | 8/2014 | Kanda et al. | |
| 2014/0250486 A1* | 9/2014 | Sze | H04L 47/38 725/127 |
| 2014/0362718 A1 | 12/2014 | Nagamine et al. | |
| 2015/0256998 A1 | 9/2015 | Umehara | |
| 2015/0341812 A1* | 11/2015 | Dion | H04W 24/08 370/252 |

FOREIGN PATENT DOCUMENTS

| | | |
|---|---|---|
| JP | 2005-064981 | 3/2005 |
| JP | 2005-229400 | 8/2005 |
| JP | 2012-050063 | 3/2012 |
| JP | 2013-153414 | 8/2013 |

OTHER PUBLICATIONS

Written Opinion dated Aug. 19, 2014 in PCT/JP2014/068507 Filed Jul. 10, 2014.
Extended European Search Report dated Jul. 28, 2016 in Patent Application No. 14834994.7.

* cited by examiner

COMPUTER PROGRAM PRODUCT, COMMUNICATION QUALITY ESTIMATION METHOD, INFORMATION PROCESSING APPARATUS, AND COMMUNICATION QUALITY ESTIMATION SYSTEM

CROSS-REFERENCE TO RELATED APPLICATIONS

This application is a continuation of PCT international application Ser. No. PCT/JP2014/068507 filed on Jul. 10, 2014 which designates the United States, incorporated herein by reference, and which claims the benefit of priority from Japanese Patent Applications No. 2013-165114, filed on Aug. 8, 2013, incorporated herein by reference.

BACKGROUND OF THE INVENTION

1. Field of the Invention

The present invention relates to a computer program product, a communication quality estimation method, an information processing apparatus, and a communication quality estimation system.

2. Description of the Related Art

Transmission systems such as conference systems in which a teleconference is held through a network such as the Internet have spread. Such a transmission system enables a communication with a remote location as if the communication is an actual communication in person.

For example, according to such a conference system, a terminal that a first participant in the teleconference uses takes an image of the first participant and collects the voice such as a speech of the first participant. Then, the terminal encodes and transmits the image and voice to a terminal that a second participant in the teleconference uses. Subsequently, the terminal that the second participant uses receives and decodes the encoded image and voice. Then, the terminal displays the decoded image and outputs the decoded voice. This implements the teleconference.

By the way, the communication implemented in such a transmission system depends on the communication situation that occurs on the network. Thus, for example, Japanese Laid-open Patent Publication No. 2005-064981 discloses a technique in which a terminal calculates the information about the line operating condition in accordance with at least one of the packet round-trip time and the rate of packet loss, and then informs the user of the line operating condition by displaying the information.

However, the conventional technique described above recognizes the communication quality when the user uses the transmission system by actually communicating with another user after the transmission system is introduced. It may be impossible in the conventional technique to recognize the communication quality when the user uses the transmission system before the transmission system is introduced.

Especially, there are large fluctuations in transfer rate of the transmission system described above because real-time transmission and reception of a large amount of data such as an image and voice is required in the transmission system. This makes it difficult to estimate the communication quality when the user uses the transmission system without performing communication in the transmission system.

In light of the foregoing, there is a need to provide a computer program product, a communication quality estimation method, an information processing apparatus, and a communication quality estimation system that can estimate the communication quality of the transmission system without performing a communication with another user in the transmission system.

SUMMARY OF THE INVENTION

It is an object of the present invention to at least partially solve the problems in the conventional technology.

A computer program product includes a non-transitory computer-readable medium containing an information processing program. The program causes a computer to function as: a first communication control unit that calculates a first transfer rate by communicating with a communication quality check server via a network; a second communication control unit that calculates delay information about communication delay by communicating with the communication quality check server via the network; an estimation unit that estimates a second transfer rate based on the first transfer rate and the delay information, the second transfer rate being lower than the first transfer rate; and a display control unit that displays communication quality information about communication quality based on the first transfer rate and the second transfer rate on a display unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The embodiments of the program, communication quality estimation method, information processing apparatus, communication quality estimation system, and storage medium according to the present invention will be described in detail with reference to the appended drawings hereinafter.

Figure 1:
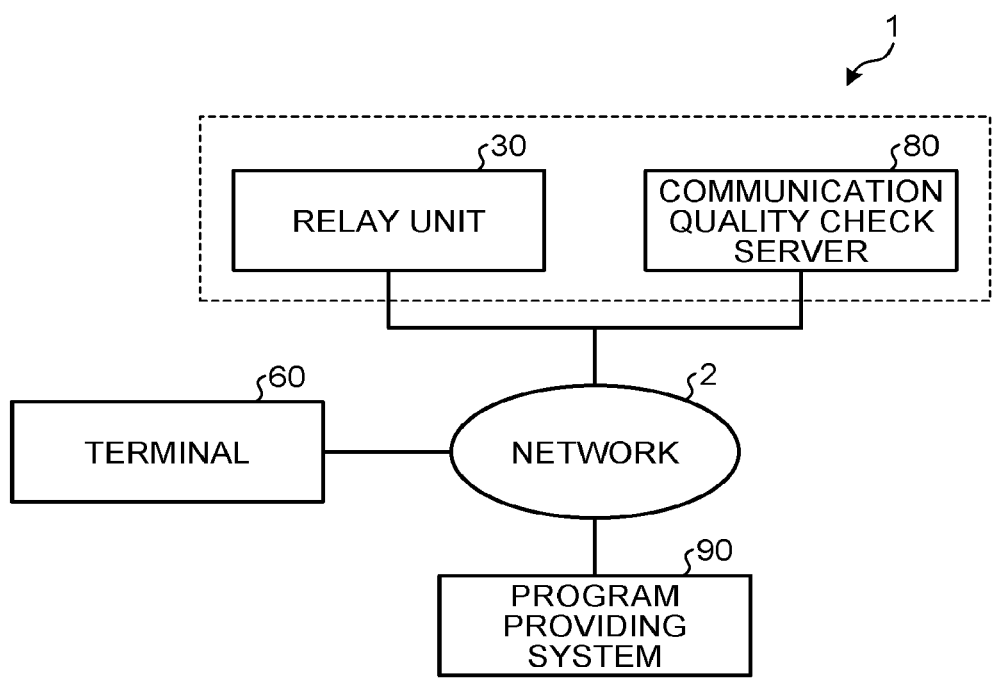
FIG. 1 is a block diagram of an exemplary configuration of a communication quality estimation system according to the present embodiment.

FIG. 1 is a block diagram of an exemplary configuration of a communication quality estimation system 1 according to the present embodiment. As illustrated in FIG. 1, the communication quality estimation system 1 includes a terminal 60, a communication quality check server 80, a relay unit 30, and a program providing system 90.

The terminal 60, the communication quality check server 80, the relay unit 30, and the program providing system 90 are connected to each other via the network 2. The Internet exemplifies the network 2 in the present embodiment. However, the network 2 is not limited to the example, and can be a Local Area Network (LAN), a dedicated line or the like.

The communication quality estimation system 1 according to the present embodiment estimates the communication quality of the transmission system, which implements a communication with a remote location, without performing a communication in the transmission system.

A video-conference system, a video-phone system, a voice conference system, a voice telephony system, or a Personal Computer (PC) screen sharing system can be cited as an example of the transmission system that implements the communication herein. Note that the transmission system will be described in detail below.

An example in which the communication quality estimation system 1 estimates the communication quality of the transmission system in a user environment before the transmission system is introduced in the user (customer) environment will be described hereinafter. However, it is not limited to the example. It is also applicable even after the transmission system is introduced in the user environment as long as the transmission system does not perform a communication.

In the present embodiment, "a transmission system is introduced in a user environment" means that the transmission system is enabled to implement a communication in the user environment. For example, the introduction and setting of communication terminals used in the transmission system to the user environment can be cited as an example of what is meant by "a transmission system is introduced in a user environment".

Note that "the introduction of communication terminals to the user environment" can mean that terminals dedicated to communication are installed on the user environment, or that a program for communication is installed on a general-purpose terminal such as a PC, a tablet terminal, or a smartphone used in the user environment.

Furthermore, "the communication quality" can indicate how much communication performance the transmission system can implement a communication with. For example, "the communication quality" can be an effective bandwidth or the quality of an assumed communication quality.

The terminal 60 (an exemplary information processing apparatus) and the communication quality check server 80 estimate the communication quality of the transmission system in a user environment. A general-purpose terminal such as a Personal Computer (PC), a tablet terminal, or a smartphone used in the user environment exemplifies the terminal 60 in the present embodiment. However, the terminal 60 is not limited to the example, and can be a terminal dedicated to communication in the transmission system. In other words, the terminal 60 can have a function for communicating with another communication terminal, similarly to the communication terminal used in the transmission system. Alternatively, when the terminal is aimed only at checking the communication quality, the terminal 60 does not have to necessarily have a function for communicating with another communication terminal using the transmission system. The communication quality check server 80 is, for example, a server unit provided in the data center of a company that operates the transmission system or in the network of a company that introduces the transmission system.

The relay unit 30 relays the communication of the communication data including an image, a voice, and a document between the communication terminals in the transmission system when the communication data is communicated. Similarly to the communication quality check server 80, the relay unit 30 is provided in the data center of a company that operates the transmission system or in the network of a company that introduces the transmission system. The communication data can be the data including at least one of an image, a voice, and a document. The communication data can include the information except for an image, a voice, and a document.

In the embodiment, the communication quality check server 80 and the relay unit 30 are provided in an area as illustrated in FIG. 1. This is because the same channel is used between the communication terminal and relay unit 30 introduced in the user environment and between the terminal 60 and communication quality check server 80 existing in the user environment. Using the same channel enables the estimation of the communication quality between the communication terminal and the relay unit 30 (the communication quality of the transmission system) from the communication situation between the terminal 60 and the communication quality check server 80.

Note that the communication quality check server 80 and the relay unit 30 can be physically integrated with each other although they are different units in the present embodiment. Alternatively, each of the communication quality check server 80 and the relay unit 30 can be implemented with a plurality of units (with physically different types of hardware).

The program providing system 90 provides (networks) a program for checking the communication quality of the transmission system to the terminal 60. Note that the program providing system 90 provides (networks) various programs necessary to implement a communication in the transmission system. However, another system can provide (network) the various programs necessary to implement a communication in the transmission system.

Figure 2:
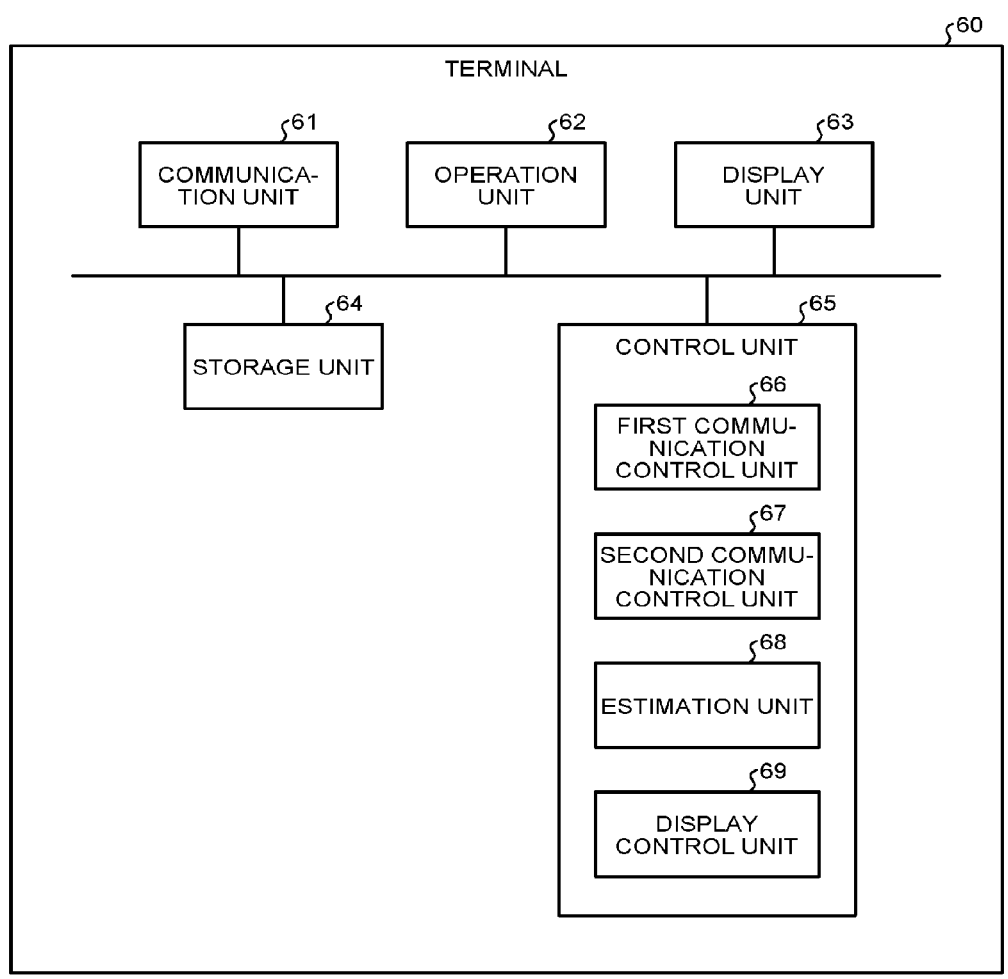
FIG. 2 is a block diagram of an exemplary configuration of a terminal according to the present embodiment.

FIG. 2 is a block diagram of an exemplary configuration of the terminal 60 according to the present embodiment. As illustrated in FIG. 2, the terminal 60 includes a communication unit 61, an operation unit 62, a display unit 63, a storage unit 64, and a control unit 65.

The communication unit 61 communicates with an external device such as the communication quality check server 80 via the network 2, and can be implemented with a communication device such as a Network Interface Card (NIC).

The operation unit 62 is used to input various operations, and can be implemented with an input device such as a key switch or a touch panel.

The display unit 63 displays various screens, and can be implemented with a display device such as a liquid crystal display or a touch panel display.

The storage unit 64 stores various programs including a program for checking the communication quality of the transmission system conducted in the terminal 60, and the data used for various processes performed in the terminal 60. The storage unit 64 can be implemented with a storage device, such as a Hard Disk Drive (HDD), a Solid State Drive (SSD), a memory card, an optical disk, or a Random Access Memory (RAM), that can store the data magnetically, optically, or electrically.

The control unit 65 controls each unit in the terminal 60, and can be implemented with a control device such as a Central Processing Unit (CPU). The control unit 65 includes a first communication control unit 66, a second communication control unit 67, an estimation unit 68, and a display control unit 69. In the embodiment, the control unit 65 implements the first communication control unit 66, the second communication control unit 67, the estimation unit 68, and the display control unit 69 as software by starting (executing) the program for checking the communication quality of the transmission system stored in the storage unit 64.

The first communication control unit 66 calculates a first transfer rate by communicating with the communication quality check server 80 via the network 2. Note that the first communication control unit 66 can communicate with the communication quality check server 80 via the network 2 in Transmission Control Protocol (TCP) communication in order to calculate the first transfer rate, or can communicate with the communication quality check server 80 via the network 2 in User Datagram Protocol (UDP) communication in order to calculate the first transfer rate. When calculating the first transfer rate in UDP communication, the first communication control unit 66 calculates also the rate of packet loss in the communication with the communication quality check server 80 via the network 2.

In the present embodiment, the first transfer rate is the highest effective transfer rate of the communication between the terminal 60 and the communication quality check server 80 via the network 2. However, the first transfer rate is not limited to the embodiment. Furthermore, in the present embodiment, the first communication control unit 66 calculates at least one of the highest effective transmission rate and the highest effective reception rate as the first transfer rate.

In the embodiment, the highest effective transmission rate can be calculated by dividing the size of the data transmitted from the first communication control unit 66 to the communication quality check server 80 by the time required to transmit the data. The highest effective reception rate can be calculated by dividing the size of the data that the first communication control unit 66 receives from the communication quality check server 80 by the time required to receive the data.

The second communication control unit 67 calculates the delay information about the communication delay by communicating with the communication quality check server 80 via the network 2. Specifically, the second communication control unit 67 calculates one of the longest communication delay time, the shortest communication delay time, the difference between the longest communication delay time and the shortest communication delay time, or the standard deviation in the communication delay times by communicating with the communication quality check server 80 via the network 2 and measuring the communication delay time multiple times.

In the embodiment, the second communication control unit 67 can exchange the data with the communication quality check server 80 via the network 2 multiple times and measure the communication delay time every time the data is transferred in order to measure the communication delay time multiple times. In such a case, the communication delay time is the time from the time when the first communication control unit 66 requests the communication quality check server 80 to transmit the data and to the time when the first communication control unit 66 receives the data.

The second communication control unit 67 can transfer the data with the communication quality check server 80 via the network 2 and measure the communication delay time every time a packet constituting the data is transferred in order to measure the communication delay time several times. In such a case, the communication delay time is the required time from the time when the first communication control unit 66 requests the communication quality check server 80 to transmit a packet to the time when the first communication control unit 66 receives the packet.

Note that the second communication control unit 67 can communicate with the communication quality check server 80 via the network 2 in TCP communication in order to calculate the delay information, or can communicate with the communication quality check server 80 via the network 2 in UDP communication in order to calculate the delay information.

The estimation unit 68 estimates a second transfer rate lower than the first transfer rate in accordance with the first transfer rate calculated by the first communication control unit 66 and the delay information calculated by the second communication control unit 67.

Note that, when the first communication control unit 66 uses UDP communication to calculate the first transfer rate, the first communication control unit 66 calculates also the rate of packet loss. Thus, the estimation unit 68 can estimate the second transfer rate in accordance with the first transfer rate calculated by the first communication control unit 66, the delay information calculated by the second communication control unit 67, and the rate of packet loss.

In the present embodiment, the second transfer rate is the lowest effective transfer rate of the communication between the terminal 60 and the communication quality check server 80 via the network 2. However, the second transfer rate is not limited to the lowest effective transfer rate. In the present embodiment, the estimation unit 68 estimates at least one of the lowest effective transmission rate and the lowest effective reception rate as the second transfer rate.

In the embodiment, the lowest effective transmission rate can be estimated from the highest effective transmission rate calculated by the first communication control unit 66 and the delay information calculated by the second communication control unit 67.

For example, when the first communication control unit 66 uses TCP communication to calculate the highest effective transmission rate, the estimation unit 68 calculates the lowest effective transmission rate from an expression (1).

$$\text{The lowest effective transmission rate} = A \times e^\wedge \times C \quad (1)$$

The A is a value obtained by multiplying the highest effective transmission rate by a corrective coefficient, the e is an exponential function, ^ is the power, and the C is the delay information.

For example, when the first communication control unit 66 uses UDP communication to calculate the highest effective transmission rate, the estimation unit 68 can calculate the lowest effective transmission rate from an expression (2) or an expression (3).

$$\text{The lowest effective transmission rate} = A/(B \times c) \quad (2)$$

The B is a value obtained by multiplying the rate of packet loss by a corrective coefficient, and the c is the standard deviation in a plurality of communication delay times.

$$\text{The lowest effective transmission rate} = A \times e^\wedge \times (B \times C) \quad (3)$$

The lowest effective reception rate can be estimated from the highest effective reception rate calculated by the first communication control unit 66 and the delay information calculated by the second communication control unit 67.

For example, when the first communication control unit 66 uses TCP communication to calculate the highest effective reception rate, the estimation unit 68 calculates the lowest effective reception rate from an expression (4).

$$\text{The lowest effective reception rate} = A' \times e^\wedge \times C \quad (4)$$

The A' is a value obtained by multiplying the highest effective reception rate by a corrective coefficient.

For example, when the first communication control unit 66 uses UDP communication to calculate the highest effective reception rate, the estimation unit 68 can calculate the lowest effective reception rate from an expression (5) or an expression (6).

$$\text{The lowest effective reception rate} = A'/(B \times c) \quad (5)$$

$$\text{The lowest effective reception rate} = A' \times e^\wedge \times (B \times C) \quad (6)$$

The display control unit 69 displays, on the display unit 63, the communication quality information about the communication quality based on the first transfer rate calculated by the first communication control unit 66 and the second transfer rate estimated by the estimation unit 68.

The communication quality information can be the information indicating how much communication performance the transmission system can perform a communication with. The information can include, for example, an effective bandwidth whose upper limit is the highest effective transfer rate and whose lower limit is the lowest effective transfer rate. In the present embodiment, the communication quality information is at least one of an effective transmission bandwidth whose upper limit is the highest effective transmission rate and whose lower limit is the lowest effective transmission rate, and an effective reception bandwidth whose upper limit is the highest effective reception rate and whose lower limit is the lowest effective reception rate.

Figure 3:
FIG. 3 is a block diagram of exemplary communication quality information according to the present embodiment.

FIG. 3 is a diagram of exemplary communication quality information according to the present embodiment. As described in FIG. 3, the effective transmission bandwidth is displayed as the upstream bandwidth of 825 to 2000 kbps, and the effective reception bandwidth is displayed as the downstream bandwidth of 851 to 2000 kbps.

Figure 4:
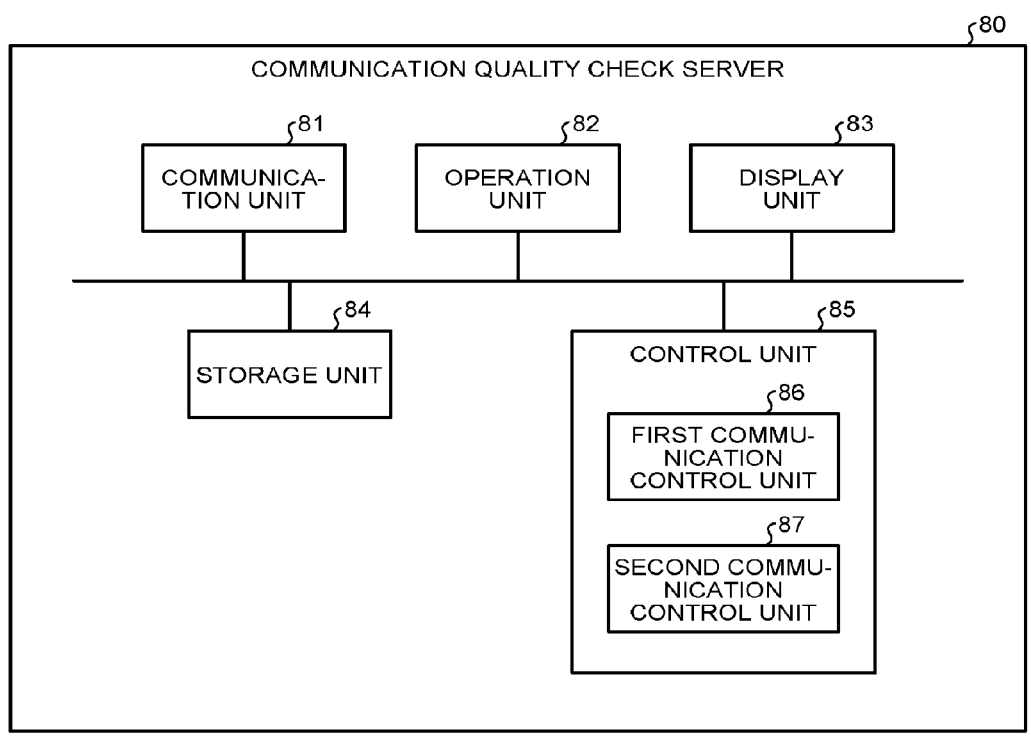
FIG. 4 is a block diagram of an exemplary configuration of a communication quality check server according to the present embodiment.

FIG. 4 is a block diagram of an exemplary configuration of the communication quality check server 80 according to the present embodiment. As illustrated in FIG. 4, the communication quality check server 80 includes a communication unit 81, an operation unit 82, a display unit 83, a storage unit 84, and a control unit 85.

The communication unit 81 is used to communicate with an external device such as the terminal 60 via the network 2, and can be implemented with a communication device such as an NIC.

The operation unit 82 is used to input various operations, and can be implemented with an input device such as a key switch or a touch panel.

The display unit 83 displays various screens, and can be implemented with a display device such as a liquid crystal display or a touch panel display.

The storage unit 84 stores various programs including the program for checking the communication quality of the transmission system executed in the communication quality check server 80, and the data used for various processes performed in the communication quality check server 80. The storage unit 84 can be implemented with a storage device, such as an HDD, an SSD, a memory card, an optical disk, and a RAM, that can store the data magnetically, optically, or electrically.

The control unit 85 controls each unit in the communication quality check server 80, and can be implemented with a control device such as a CPU. The control unit 85 includes a first communication control unit 86, and a second communication control unit 87. In the example, the control unit 85 implements the first communication control unit 86 and the second communication control unit 87 as software by starting (executing) the program for checking the communication quality of the transmission system stored in the storage unit 84.

The first communication control unit 86 communicates with the terminal 60 via the network 2. This enables the first communication control unit 66 of the terminal 60 to calculate the first transfer rate.

The second communication control unit 87 communicates with the terminal 60 via the network 2. This enables the second communication control unit 67 of the terminal 60 to calculate the delay information.

Figure 5:
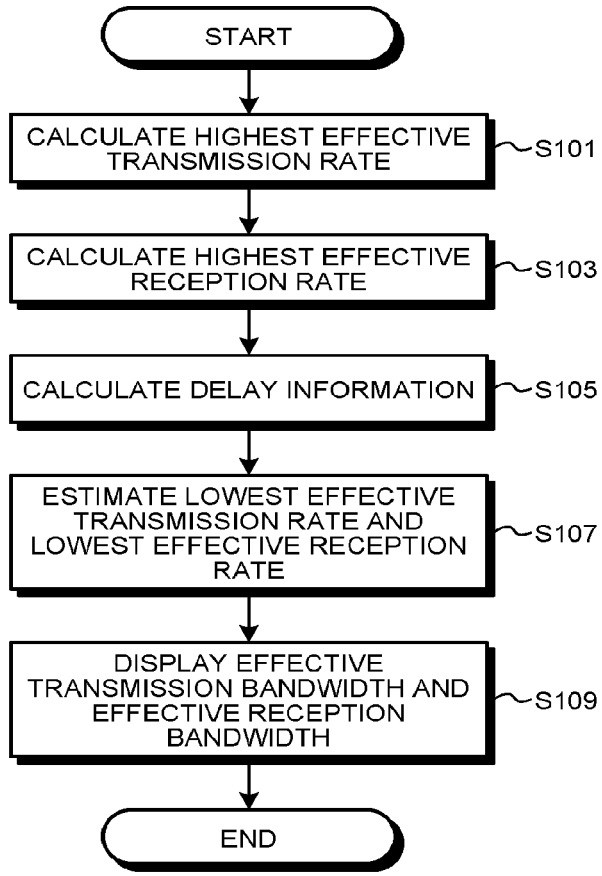
FIG. 5 is a flowchart of exemplary procedures of a process performed in the communication quality estimation system according to the present embodiment.

FIG. 5 is a flowchart of exemplary procedures of a process performed in the communication quality estimation system 1 according to the present embodiment.

First, the first communication control unit 66 of the terminal 60 and the first communication control unit 86 of the communication quality check server 80 control the data transmission from the terminal 60 to the communication quality check server 80 via the network 2. The first communication control unit 66 calculates the highest effective transmission rate by dividing the size of the transmitted data by the time required to transmit the data (step S101).

Subsequently, the first communication control unit 66 of the terminal 60 and the first communication control unit 86 of the communication quality check server 80 control the data reception of the terminal 60 from the communication quality check server 80 via the network 2. The first communication control unit 66 calculates the highest effective reception rate by dividing the size of the received data by the time required to receive the data (step S103).

Subsequently, the second communication control unit 67 of the terminal 60 and the second communication control unit 87 of the communication quality check server 80 control the communication quality check server 80 to return the data to the terminal 60 via the network 2 in response to the data transmission request from the terminal 60. Then, the second communication control unit 67 measures the time from the data transmission request to the data reception as the communication delay time. The second communication control unit 67 and the second communication control unit 87 repeat the data transmission request from the terminal 60 and the data return from the communication quality check server 80. This repetition causes the second communication control unit 67 to repeat the measurement of the communication delay time and calculate the delay information (step S105).

Note that the order of procedures of the process in steps S101 to S105 is not limited to the embodiment, and the procedures can be performed in a different order, or some of the procedures can simultaneously be performed.

Subsequently, the estimation unit 68 of the terminal 60 estimates the lowest effective transmission rate using one of the expressions (1) to (3) and in accordance with the highest effective transmission rate and the delay information. Meanwhile, the estimation unit 68 estimates the lowest effective reception rate using one of the expressions (4) to (6) and in accordance with the highest effective reception rate and the delay information (step S107).

Subsequently, the display control unit 69 of the terminal 60 displays, on the display unit 63, the effective transmission bandwidth whose upper limit is the highest effective transmission rate and whose lower limit is the lowest effective transmission rate, and the effective reception bandwidth whose upper limit is the highest effective reception rate and whose lower limit is the lowest effective reception rate (step S109).

Figure 6:
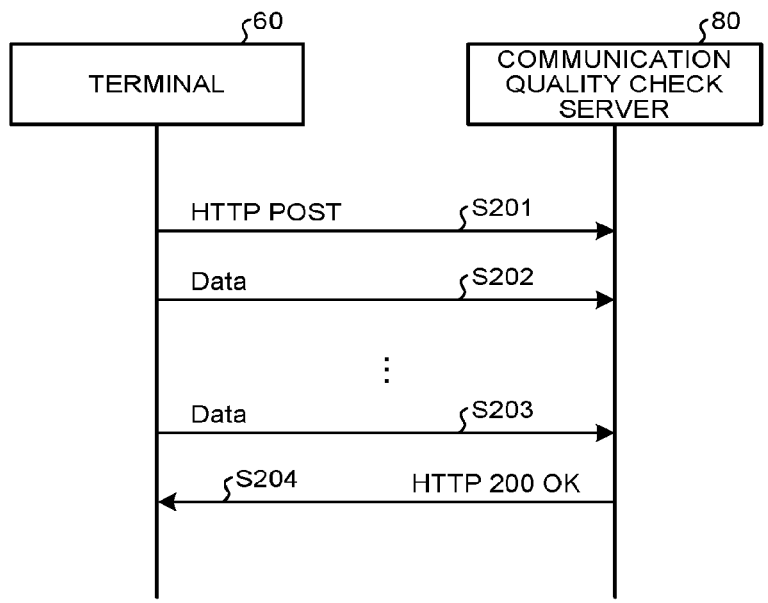
FIG. 6 is a sequence diagram of an exemplary calculation of the highest effective transmission rate in TCP communication in step S101 of FIG. 5.

FIG. 6 is a sequence diagram of an exemplary calculation of the highest effective transmission rate in TCP communication in step S101 of FIG. 5.

First, the first communication control unit 66 of the terminal 60 transmits Hypertext Transfer Protocol (HTTP) POST to the communication quality check server 80 via the network 2 (step S201), and sequentially transmits Data (specifically, packets) to the communication quality check server 80 (steps S202 to S203).

The size of the data transmitted from the terminal 60 to the communication quality check server 80 in the example is preferably larger than or equal to one MByte. The first communication control unit 66 transmits the data larger than or equal to one MByte to the communication quality check server 80 by the packet.

Subsequently, when the data transmission from the terminal 60 to the communication quality check server 80 is completed, the first communication control unit 86 of the communication quality check server 80 transmits HTTP 200 OK to the terminal 60 (step S204).

When receiving HTTP 200 OK, the first communication control unit 66 calculates the highest effective transmission rate (kbps) by dividing the size of the transmitted data by the time required to transmit the data (the time required to perform the process in steps S202 to S204).

Note that, instead of the first communication control unit 66, the first communication control unit 86 can calculate the highest effective transmission rate. In such a case, the first communication control unit 86 can calculate the highest effective transmission rate (kbps) by dividing the size of the received data by the time required to receive the data (the time required to perform the process in steps S202 to S204), and transmit the calculated highest effective transmission rate to the terminal 60.

Figure 7:
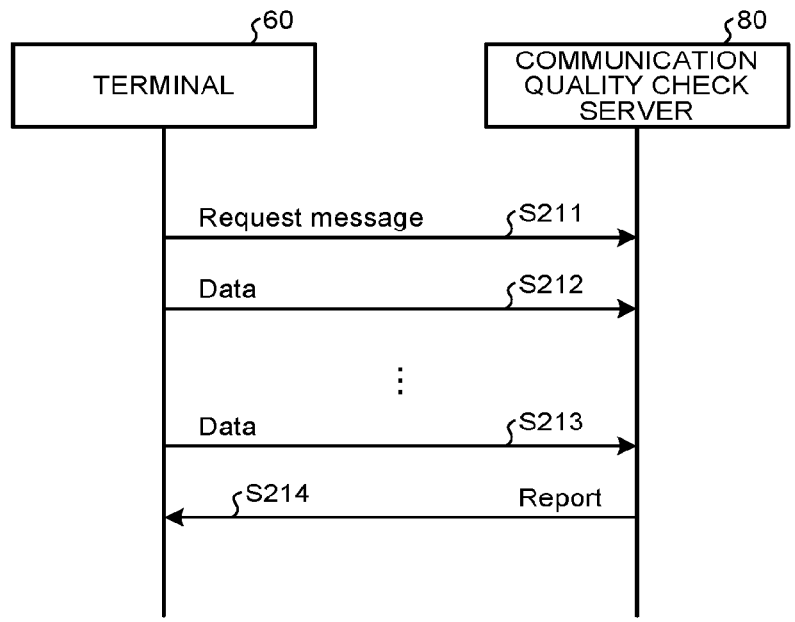
FIG. 7 is a sequence diagram of an exemplary calculation of the highest effective transmission rate in UDP communication in step S101 of FIG. 5.

FIG. 7 is a sequence diagram of an exemplary calculation of the highest effective transmission rate in UDP communication in step S101 of FIG. 5.

First, the first communication control unit 66 of the terminal 60 transmits Request message to the communication quality check server 80 via the network 2 (step S211), and sequentially transmits Data (specifically, packets) to the communication quality check server 80 (steps S212 to S213).

In this example, Request message preferably includes the measurement period to perform the measurement related to the received packets (the period required to transmit the data) because of UDP communication. Furthermore, the size of the data transmitted from the terminal 60 to the communication quality check server 80 is preferably larger than or equal to one MByte. The first communication control unit 66 transmits the data larger than or equal to one MByte to the communication quality check server 80 by the packet. Note that each packet includes unique identification information such as the numbers incremented in order. The transmission bit rate of each packet is preferably the highest transmission rate to be used in the transmission system.

Subsequently, when the measurement period has elapsed, the first communication control unit 86 of the communication quality check server 80 transmits the reception time when the first packet is received, the reception time when the last packet is received, the total number of received packets (the total number of pieces of identification information), and the total size of received packets as report to the terminal 60 (step S214).

When receiving report, the first communication control unit 66 calculates the time required to transmit the data from the reception time when the first packet is received and the reception time when the last packet is received that are included in report. Then, the first communication control unit 66 calculates the highest effective transmission rate (kbps) by dividing the total size of received packets by the time required to transmit the data. Furthermore, the first communication control unit 66 calculates the number of packets that fail to transmit to the communication quality check server 80 by subtracting the total number of received packets from the total number of packets. The first communication control unit 66 calculates the rate of packet loss by dividing the number of packets that fail to transmit by the total number of packets.

Note that, instead of the first communication control unit 66, the first communication control unit 86 can calculate the highest effective transmission rate and the rate of packet loss. In such a case, the first communication control unit 86 can transmit the calculated highest effective transmission rate and rate of packet loss as report to the terminal 60.

Figure 8:
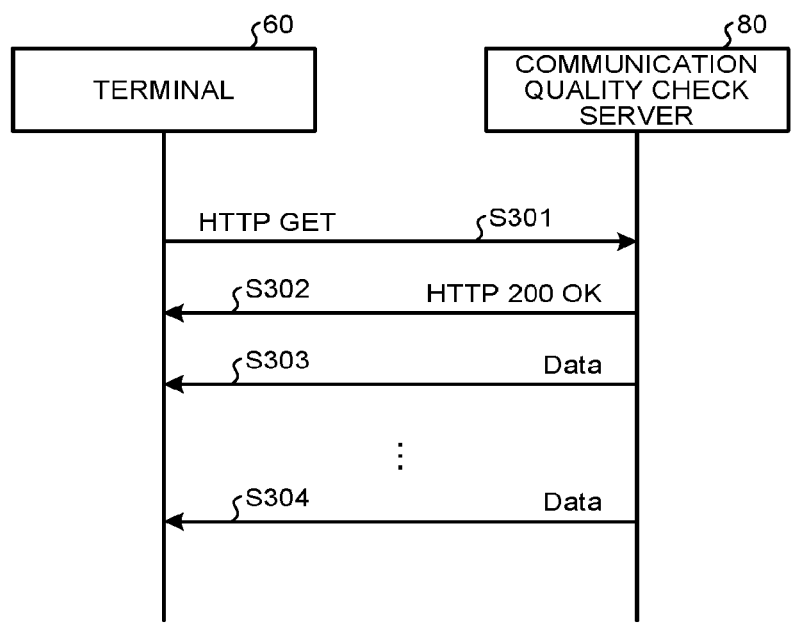
FIG. 8 is a sequence diagram of an exemplary calculation of the highest effective reception rate in TCP communication in step S103 of FIG. 5.

FIG. 8 is a sequence diagram of an exemplary calculation of the highest effective reception rate in TCP communication in step S103 of FIG. 5.

First, the first communication control unit 66 of the terminal 60 transmits HTTP GET to the communication quality check server 80 via the network 2 (step S301).

Subsequently, the first communication control unit 66 receives HTTP 200 OK from the first communication control unit 86 of the communication quality check server 80 via the network 2 (step S302), and sequentially receives Data (specifically, packets) from the first communication control unit 86 (steps S303 to S304).

In this example, the size of the data that the terminal 60 receives from the communication quality check server 80 is preferably larger than or equal to one MByte. The first communication control unit 66 receives the data larger than or equal to one MByte from the communication quality check server 80 by the packet.

Then, when the data reception from the communication quality check server 80 is completed, the first communication control unit 66 calculates the highest effective reception rate (kbps) by dividing the size of the received data by the time required to receive the data (the time required to perform the process in steps S302 to S304).

Note that, instead of the first communication control unit 66, the first communication control unit 86 can calculate the highest effective reception rate. In such a case, the first communication control unit 86 can calculate the highest effective reception rate (kbps) by dividing the size of the transmitted data by the time required to transmit the data (the time required to perform the process in steps S302 to S304), and transmit the calculated highest effective reception rate to the terminal 60.

Figure 9:
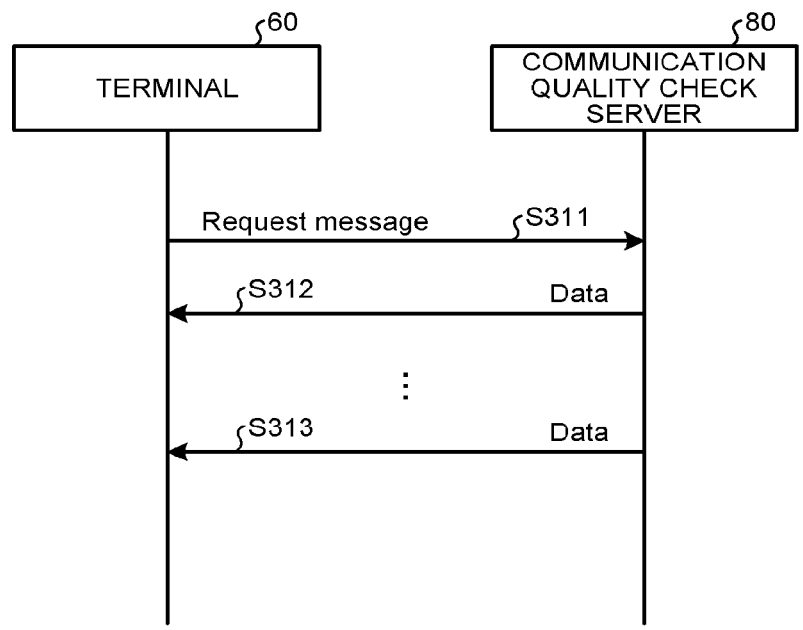
FIG. 9 is a sequence diagram of an exemplary calculation of the highest effective reception rate in UDP communication in step S103 of FIG. 5.

FIG. 9 is a sequence diagram of an exemplary calculation of the highest effective reception rate in UDP communication in step S103 of FIG. 5.

First, the first communication control unit 66 of the terminal 60 transmits Request message to the communication quality check server 80 via the network 2 (step S311).

Subsequently, the first communication control unit 66 sequentially receives Data (specifically, packets) from the first communication control unit 86 of the communication quality check server 80 via the network 2 (steps S312 to S313).

In this example, Request message preferably includes the size of the data whose transmission is to be requested to the communication quality check server 80 and the reception bit rate of each packet because of UDP communication. Note that the size of the data whose transmission is to be requested to the communication quality check server 80 is preferably larger than or equal to one MByte. The first communication control unit 86 of the communication quality check server 80 transmits the data larger than or equal to one MByte to the terminal 60 by the packet. The reception bit rate of each packet is preferably the highest reception rate to be used in the transmission system. Note that each packet includes, for example, unique identification information such as the numbers incremented in order.

When receiving the data of the requested size, the first communication control unit 66 calculates the time required to receive the data from the reception time when the first packet is received and the reception time when the last packet is received. Then, the first communication control unit 66 calculates the highest effective reception rate (kbps) by dividing the size of the data by the time required to receive the data. Furthermore, the first communication control unit 66 calculates the number of packets that fail to receive from the communication quality check server 80 by subtracting the total number of received packets from the total number of packets. Then, the first communication control unit 66 calculates the rate of packet loss by dividing the number of packets that fail to receive by the total number of packets.

Figure 10:
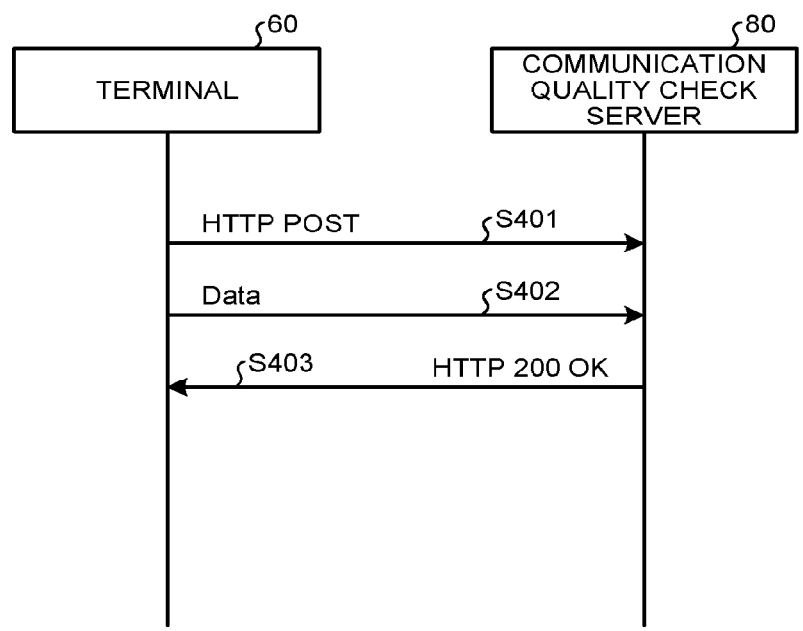
FIG. 10 is a sequence diagram of an exemplary calculation of the communication delay time with HTTP POST in TCP communication in step S105 of FIG. 5.

FIG. 10 is a sequence diagram of an exemplary calculation of the communication delay time with HTTP POST in TCP communication in step S105 of FIG. 5.

First, the second communication control unit 67 of the terminal 60 transmits HTTP POST to the communication quality check server 80 via the network 2 (step S401), and starts the measurement of the communication delay time. Then, the second communication control unit 67 transmits Data (specifically, a packet) to the communication quality check server 80 (step S402).

In this example, the size of the data transmitted from the terminal 60 to the communication quality check server 80 is preferably lower than or equal to 1500 Bytes.

Subsequently, when the data transmission from the terminal 60 to the communication quality check server 80 is completed, the second communication control unit 87 of the communication quality check server 80 transmits HTTP 200 OK to the terminal 60 (step S403).

When receiving HTTP 200 OK, the second communication control unit 67 terminates the measurement of the communication delay time and determines the time from the transmission of HTTP POST to the reception of HTTP 200 OK (the time required to perform the process in step S401 to S403) as the communication delay time.

In terms of accuracy, it is preferable that the second communication control unit 67 measures a plurality of communication delay times by repeating the process illustrated in FIG. 10 a certain number of times or for a certain period of time, and then calculates the delay information. This is because it is assumed that the communication implemented in the transmission system is continued for a certain period of time.

Figure 11:
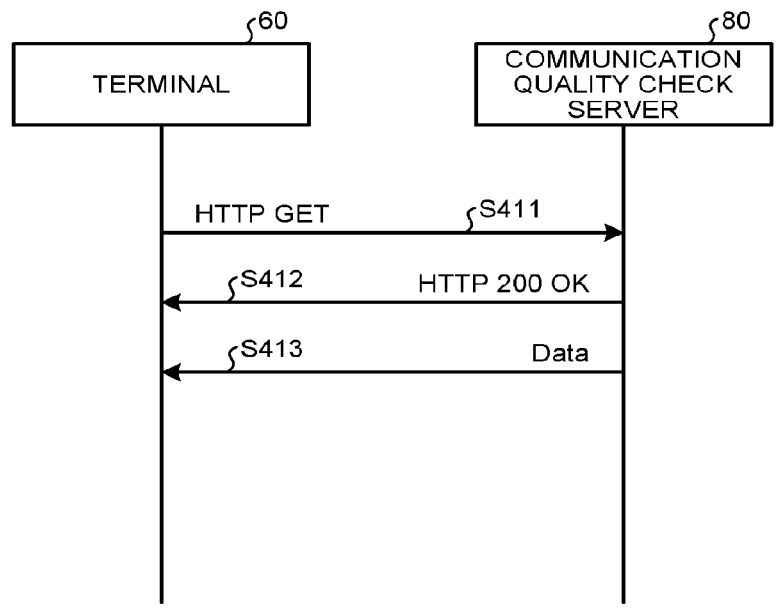
FIG. 11 is a sequence diagram of an exemplary calculation of the communication delay time with HTTP GET in TCP communication in step S105 of FIG. 5.

FIG. 11 is a sequence diagram of an exemplary calculation of the communication delay time with HTTP GET in TCP communication in step S105 of FIG. 5.

First, the second communication control unit 67 of the terminal 60 transmits HTTP GET to the communication quality check server 80 via the network 2 (step S411), and starts the measurement of the communication delay time.

Subsequently, the second communication control unit 67 receives HTTP 200 OK from the second communication control unit 87 of the communication quality check server 80 via the network 2 (step S412), and subsequently receives Data (specifically, a packet) from the second communication control unit 87 (step S413).

In this example, the size of the data that the terminal 60 receives from the communication quality check server 80 is preferably lower than or equal to 1500 Bytes.

When receiving the packets, the second communication control unit 67 terminates the measurement of the communication delay time, and determines the time from the transmission of HTTP GET to the reception of the packet (the time required to perform the process in steps S411 to S413) as the communication delay time.

In terms of accuracy, it is preferable that the second communication control unit 67 measures a plurality of communication delay times by repeating the process illustrated in FIG. 11 a certain number of times or for a certain period of time, and then calculates the delay information. This is because it is assumed that the communication implemented in the transmission system is continued for a certain period of time.

Figure 12:
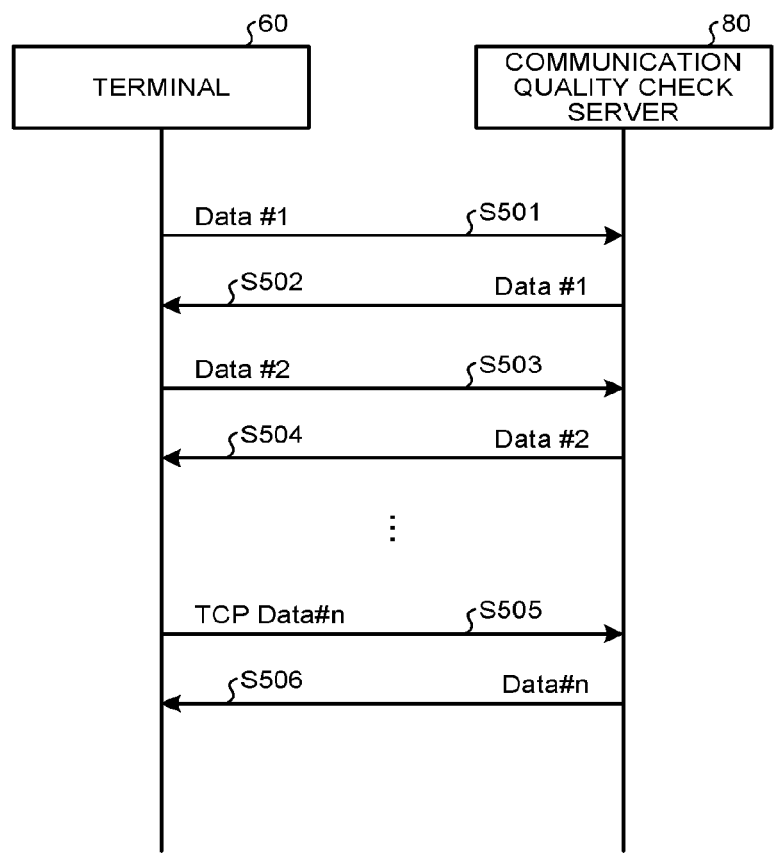
FIG. 12 is a sequence diagram of another exemplary calculation of the communication delay time in TCP communication in step S105 of FIG. 5.

FIG. 12 is a sequence diagram of another exemplary calculation of the communication delay time in TCP communication in step S105 of FIG. 5.

First, the second communication control unit 67 of the terminal 60 transmits Data (specifically, a packet) to the communication quality check server 80 via the network 2 (step S501). In this example, the packet includes the time information.

When receiving the packet from the terminal 60, the second communication control unit 87 of the communication quality check server 80 transmits the received packet to the terminal 60 via the network 2 (step S502). In this example, the packet includes the time information.

When receiving the packet, the second communication control unit 67 calculates the difference between the time information in the transmitted packet and the time information in the received packet, and determines the difference as the communication delay time.

After that, the second communication control unit 67 of the terminal 60 and the second communication control unit 87 of the communication quality check server 80 measure a plurality of communication delay times by repeating the process (in steps S503 to S506) similar to the process in steps S501 to S502, and calculate the delay information.

In the present embodiment, the process in step S105 of FIG. 5 is performed in TCP communication. However, the communication in which the process is performed is not limited to TCP communication, and the process can be performed also in UDP communication.

In the present embodiment as described above, performing the communication with the relay unit and the communication quality check server placed in the same area via the network in the transmission system calculates the first transfer rate of the network and the delay information about the communication delay of the network. The second transfer rate lower than the first transfer rate is estimated based on the first transfer rate and the delay information. The communication quality information about the communication quality based on the first transfer rate and the second transfer rate is displayed. According to the present embodiment, the communication quality of the transmission system can be estimated without performing a communication in the transmission system. In other words, the communication quality based on the assumption of the actual communication environment can be checked without introducing the transmission system into the user environment. When the terminal 60 has a function to communicate with another communication terminal, similarly to the communication terminal used in the transmission system, the communication quality based on the assumption of the actual communication environment can be checked without performing actual communication with another communication terminal in the configuration illustrated in FIG. 14 as described below.

In the present embodiment in detail, the highest effective transfer rate is calculated as the first transfer rate. Any one of the longest communication delay time, the shortest communication delay time, the difference between the longest communication delay time and the shortest communication delay time, and the standard deviation of the communication delay times is calculated as the delay information. The lowest effective transfer rate is estimated as the second transfer rate. The effective bandwidth whose upper limit is the highest effective transfer rate and whose lower limit is the lowest effective transfer rate is displayed as the communication quality information.

In the present embodiment as described above, the lowest effective transfer rate is estimated with the highest effective transfer rate and the delay information. The lowest effective transfer rate reflecting the actual condition of the communication in the transmission system that performs communication can be estimated. The effective bandwidth reflecting the actual condition of the communication in the transmission system that performs communication can be displayed.

In general, the bit rate is dynamically reduced in the network in which the delay largely fluctuates because stable data transmission and reception in real time is required in the transmission system that performs communication. Thus, when the delay largely fluctuates, the lowest effective transfer rate has a tendency to considerably decrease relative to the highest effective transfer rate. This makes it difficult to specify the extent to which the lowest effective transfer rate decreases unless the communication is actually performed in the transmission system.

A general method for calculating the lowest effective transfer rate in a network is, for example, that a plurality of transfer rates is calculated by repeating a communication and the lowest transfer rate is determined as the lowest effective transfer rate. However, the lowest effective transfer rate calculated with such a method is not low enough to reflect the lowest effective transfer rate of the actual environment described above, and higher than the actual lowest effective transfer rate because the fluctuations in delay cannot be sufficiently considered. This significantly reduces the accuracy.

On the other hand, the lowest effective transfer rate is estimated with the delay information in the present embodiment. This enables the estimation of the lowest effective transfer rate in consideration of the fluctuations in delay. The lowest effective transfer rate reflecting the actual condition of the communication in the transmission system that performs communication can be estimated. The effective bandwidth reflecting the actual condition of the communication in the transmission system that performs communication can be displayed.

(Hardware Configuration)

Figure 13:
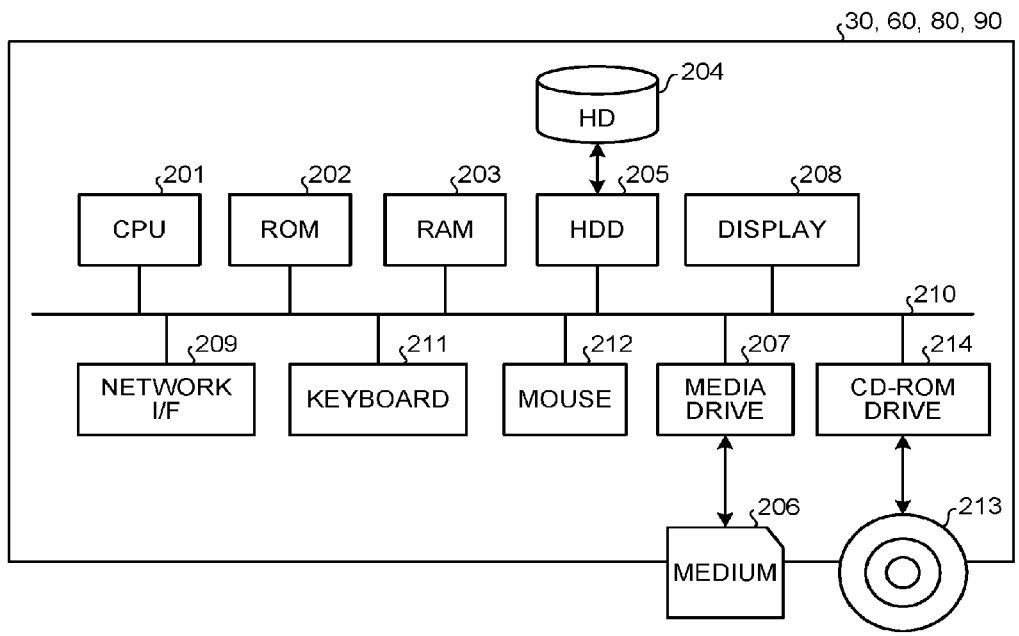
FIG. 13 is a diagram of an exemplary hardware configuration of a terminal, a communication quality check server, a relay unit, and a program providing system according to the present embodiment.

FIG. 13 is a diagram of an exemplary hardware configuration of the terminal 60, the communication quality check server 80, the relay unit 30, and the program providing system 90 in the embodiment described above.

The terminal 60 includes: a CPU 201 that entirely controls the operation of the terminal 60; a ROM 202 that stores a program for checking the communication quality of the transmission system; a RAM 203 used as a work area of the CPU 201; a Hard Disk (HD) 204 that stores various types of data; an HDD 205 that controls the read and write of the various types of data from and to the HD 204 in accordance with the control by the CPU 201; a media drive 207 that controls the read and write (storage) of data from and to a recording medium 206 such as a flash memory; a display 208 that displays various types of information including a cursor, a menu, a window, a character, or an image; a network I/F 209 used to transfer data using the network 2; a keyboard 211 including a plurality of keys for inputting a character, a numerical value, or various instructions; a mouse 212 that selects or performs various instructions, selects an object to be processed, and moves the cursor; a CD-ROM drive 214 that controls the read and write of data from and to a Compact Disc Read Only Memory (CD-ROM) 213 that is an exemplary detachable recording medium; and a bus line 210, such as an address bus or a data bus, for electrically connecting the components described above in a way illustrated in FIG. 13. However, when the terminal 60 has a function to communicate with another communication terminal, similarly to the communication terminal used in the transmission system, the hardware configuration of the terminal 60 can be the hardware configuration described below s illustrated in FIG. 16.

Note that the program for checking the communication quality of the transmission system can be a file in an installable or executable format, and can be recorded in the recording medium 206 or a computer readable recording medium such as the CD-ROM 213 so that the file is distributed.

The program executed in the terminal 60 has a module configuration to implement each of the components described above on the computer. As actual hardware, the CPU 201 reads the program from the ROM 202 on the RAM 203 and executes the program and this implements each of the components described above on the computer.

The communication quality check server 80 has a hardware configuration similar to the terminal 60, and thus the description will be omitted. However, a program for checking the communication quality of the transmission system is stored in the ROM 202 in order to control the communication quality check server 80. In such a case, the program for checking the communication quality of the transmission system is also a file in an installable or executable format, and can be recorded in the recording medium 206 or a computer readable recording medium such as the CD-ROM 213 so that the file is distributed.

The relay unit 30 has a hardware configuration similar to the terminal 60, and thus the description will be omitted. However, a program for controlling the relay unit 30 is recorded in the ROM 202. In such a case, the program for checking the communication quality of the transmission system is also a file in an installable or executable format, and can be recorded in the recording medium 206 or a computer readable recording medium such as the CD-ROM 213 so that the file is distributed.

The program providing system 90 has a hardware configuration similar to the terminal 60, and thus the description will be omitted. However, a program for controlling the program providing system 90 is recorded in the ROM 202. In such a case, the program for checking the communication quality of the transmission system is also a file in an installable or executable format, and can be recorded in the recording medium 206 or a computer readable recording medium such as the CD-ROM 213 so that the file is distributed.

Note that, as another exemplary detachable recording medium, the program can be recorded in a computer readable recording medium such as a Compact Disc Recordable (CD-R), a Digital Versatile Disk (DVD), or a Blu-ray disc.

(Configuration of Transmission System)

Figure 14:
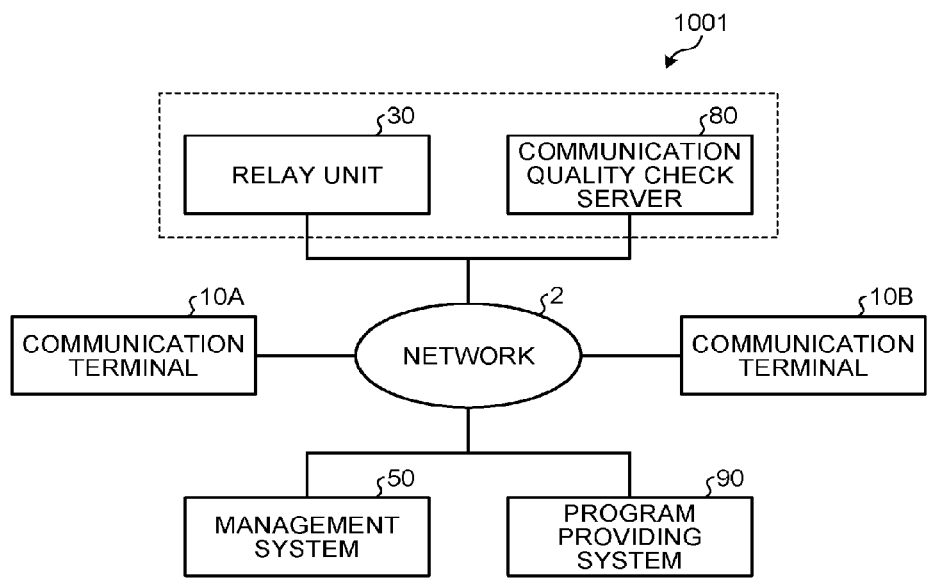
FIG. 14 is a block diagram of an exemplary configuration of a transmission system.

FIG. 14 is a block diagram of an exemplary configuration of a transmission system 1001. As illustrated in FIG. 14, the transmission system 1001 includes communication terminals 10A and 10B, a communication quality check server 80, a relay unit 30, a management system 50, and a program providing system 90.

The communication terminals 10A and 10B, the communication quality check server 80, the relay unit 30, the management system 50, and the program providing system 90 are connected to each other via the network 2. In the present embodiment, the Internet is the network 2. However, the network 2 is not limited to the embodiment. The network 2 can be a LAN or a dedicated line.

FIG. 14 illustrates a system configuration when the users of the communication terminals 10A and 10B introduce the transmission system 1001. The communication terminals 10A and 10B can communicate with each other using an image, a voice and a document by communicating with the management system 50 and the relay unit 30.

Note that the communication quality check server 80, the relay unit 30, and the program providing system 90 are similar to those in the communication quality estimation system 1. Thus the descriptions will be omitted.

The communication terminals 10A and 10B transmit and receive communication data including an image, a voice, and a document via the relay unit 30. In the example illustrated in FIG. 14, the communication terminals 10A and 10B exemplify the communication terminals. However, the number of communication terminals is not limited to the example. In the following description, when it is unnecessary to distinguish the communication terminals 10A and 10B from each other, the communication terminals 10A and 10B are sometimes referred to merely as a communication terminal 10.

Figure 15:
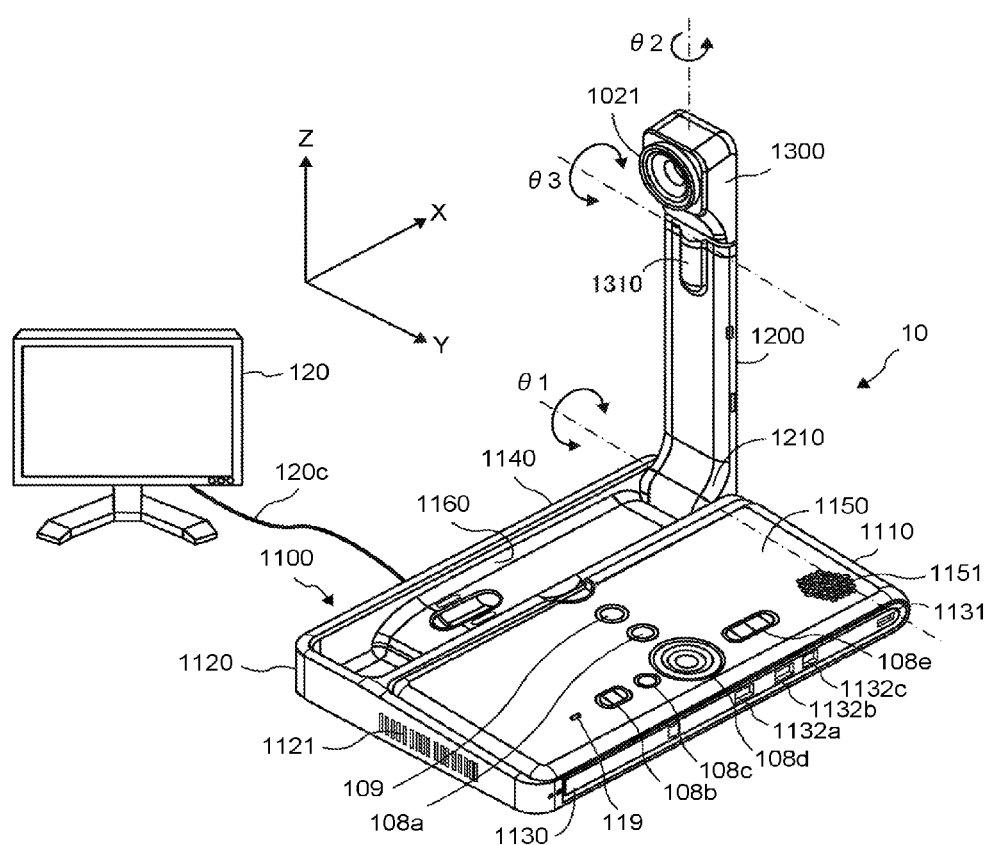
FIG. 15 is a diagram of an exemplary appearance of a communication terminal according to the present embodiment.

FIG. 15 is a diagram of an exemplary appearance of the communication terminal 10 according to the present embodiment. Hereinafter, the longitudinal direction of the communication terminal 10 is an X axis direction, the direction perpendicular to the X axis direction on a horizontal plane is a Y axis direction, and the direction (vertical direction) perpendicular to the X axis direction and Y axis direction is a Z axis direction.

As illustrated in FIG. 15, the communication terminal 10 includes a body 1100, an arm 1200, and a camera housing 1300. Among them, an intake surface (not illustrated) including a plurality of intake openings is provided on a front wall surface 1110 of the body 1100. An exhaust surface 1121 including a plurality of exhaust openings is provided on a rear wall surface 1120 of the body 1100. Thus, driving a cooling fun embedded in the body 1100 can take ambient air around the rear end of the communication terminal 10 through the intake surface (not illustrated), and can emit the air outside the rear end of the terminal 10 through the exhaust surface 1121. A sound pickup opening 1131 is formed on a right wall surface 1130 of the body 1100 so that a built-in microphone 114 described below can collect a sound such as a voice, a sound, or a noise.

An operation panel 1150 is formed in an area near the right wall surface 1130 on the body 1100. The operation panel 1150 is provided with a plurality of operation buttons (108a to 108e) described below, a power switch 109 described below, and an alarm lamp 119 described below, and is provided also with a sound output surface 1151 including a plurality of voice output openings to pass the output sound from a built-in loud speaker 115 described below. A storage portion 1160 that is a concavity for storing the arm 1200 and the camera housing 1300 is formed in an area near the left wall surface 1140 on the body 1100. A plurality of connecting ports (1132a to 1132c) to electrically connect a cable to an external device connection I/F 118 described below is provided on the right wall surface 1130 of the body 1100. On the other hand, a connecting port (not illustrated) to electrically connect a cable 120c for the display 120 to the external device connection I/F 118 is provided on the left wall surface 1140 of the body 1100.

Note that, hereinafter, an "operation button 108" is used to describe an arbitrary operation button among the operation buttons (108a to 108e), and a "connecting port 1132" is used to describe an arbitrary connecting port among the connecting ports (1132a to 1132c).

Next, the arm 1200 is attached to the body 1100 through a torque hinge 1210. The arm 1200 is rotatable around the body 1100 up and down in a range of a tilt angle $\theta 1$ of 135 degrees. FIG. 15 illustrates that the tilt angle $\theta 1$ is 90 degrees.

The camera housing 1300 is provided with a built-in camera 1021 described below, which can take an image, for example, of the user, a document, or a room. Furthermore, a torque hinge 1310 is formed on the camera housing 1300. The camera housing 1300 is attached to the arm 1200 through the torque hinge 1310 so that the camera housing 1300 is rotatable around the arm 1200 right and left in a range of a panning angle $\theta 2$ of ±180 degrees and up and down in a range of a tilt angle $\theta 3$ of ±45 degrees, supposing that FIG. 15 illustrates the state in which both of the panning angle $\theta 2$ and the tilt angle $\theta 3$ are zero degree.

Figure 16:
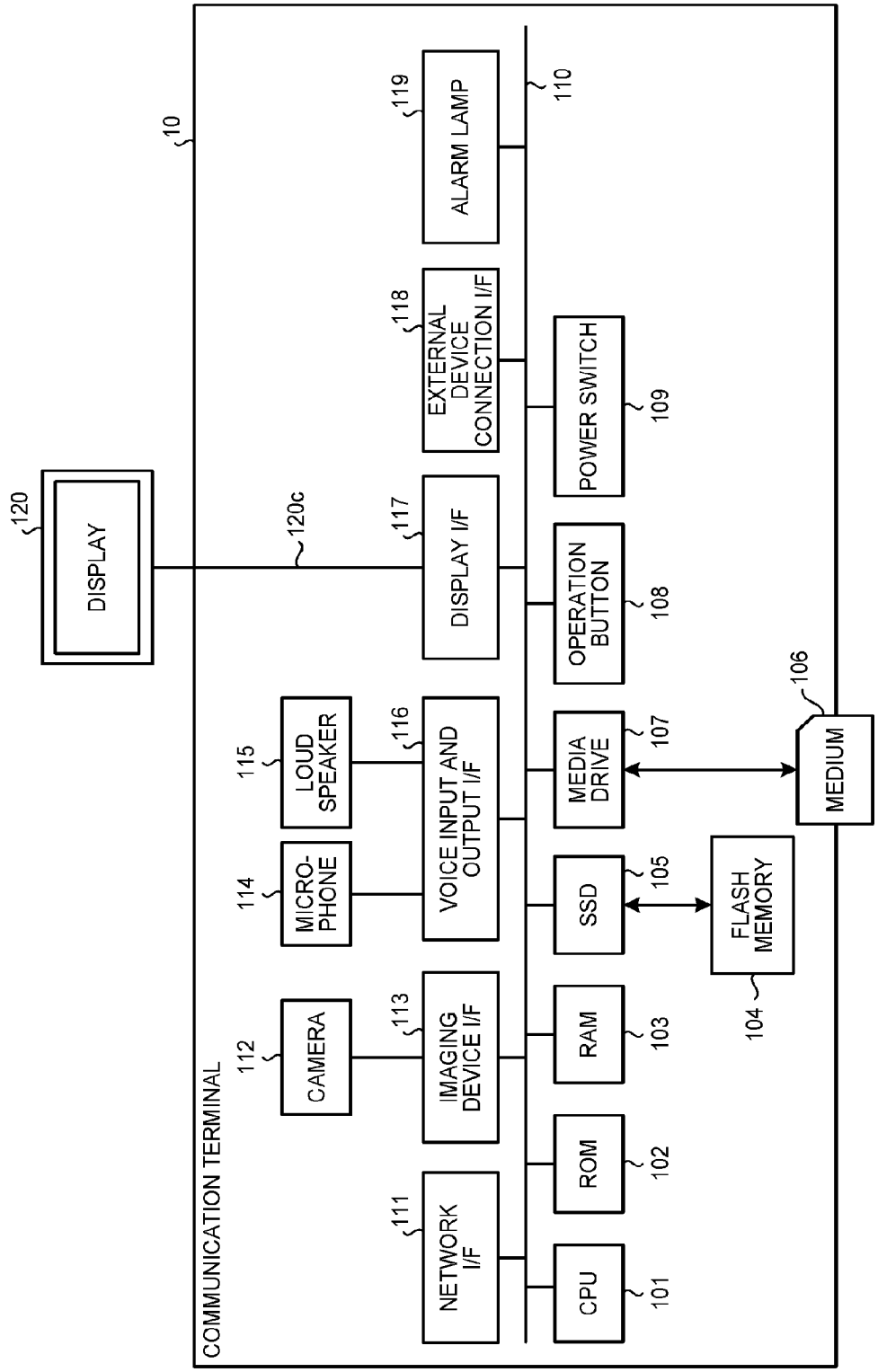
FIG. 16 is a diagram of an exemplary hardware configuration of the communication terminal according to the present embodiment.

FIG. 16 is a diagram of an exemplary hardware configuration of the communication terminal 10 according to the present embodiment. As illustrated in FIG. 16, the communication terminal 10 of the present embodiment includes: a CPU 101 that entirely controls the operation of the communication terminal 10; a ROM 102 that stores a program for the communication terminal; a RAM 103 used as a work area of the CPU 101; a flash memory 104 that stores various types of data such as image data or voice data; an SSD 105 that controls the read and write of the various types of data from and to the flash memory 104 in accordance with the control by the CPU 101; a media drive 107 that controls the read and write (storage) of data from and to a recording medium 106 such as a flash memory; an operation button 108 that is operated, for example, when the destination of the communication terminal 10 is selected; a power switch 109 that switches the ON and OFF of the power of the communication terminal 10; and a network Interface (I/F) 111 used to transfer the data using the network 2.

The communication terminal 10 further includes: a built-in camera 112 that takes an image of the object and obtains the image in accordance with the control by the CPU 101; an imaging device I/F 113 that controls the driving of the camera 112; a built-in loud speaker 115 that outputs a voice; a voice input and output I/F 116 that process the input and output of the voice signal between the microphone 114 and the loud speaker 115 in accordance with the control by the CPU 101; a display I/F 117 that transfers image data to the external display 120 in accordance with the control by the CPU 101; an external device connection I/F 118 that is attached to the connecting ports 1132*a* to 1132*c* illustrated in FIG. 15 in order to connect the external devices; an alarm lamp 119 that informs the malfunction of each function of the communication terminal 10; and a bus line 110, such as an address bus or a data bus, for electrically connecting the components described above in a way illustrated in FIG. 16.

The display 120 is a display unit made of liquid crystal or organic EL, and used to display an image of the object or an icon for operation. The display 120 is connected to the display I/F 117 by the cable 120*c*. The cable 120*c* can be a cable for an analog RGB (VGA) signal, can be a cable for component video, or can be a High-Definition Multimedia Interface (HDMI) (a registered trademark), or a cable for a Digital Video Interactive (DVI) signal.

The camera 112 includes a lens, and a solid imaging device that computerizes the image (video picture) of the object by converting the light into electrical charge. For example, a Complementary Metal Oxide Semiconductor (CMOS) or a Charge Coupled Device (CCD) can be used as the solid imaging device.

An external device such as an external camera, an external microphone, or an external loud speaker is connectable to the external device connection I/F 118, for example, by a Universal Serial Bus (USB) cable. When an external camera is connected to the external device connection I/F 118, the external camera is driven in accordance with the control by the CPU 101. The driving of the external camera is given higher priority over the driving of the built-in camera 112. Similarly, when an external microphone or an external loud speaker is connected to the external device connection I/F 118, the external microphone or the external loud speaker is driven in accordance with the control by the CPU 101. The driving of the external microphone or the external loud speaker is given higher priority over the driving of the built-in microphone 114 or the built-in loud speaker 115.

Note that the recording medium 106 is detachable from the communication terminal 10. The flash memory 104 is not a limiting example, and can be any non-volatile memory that reads or writes data in accordance with the control by the CPU 101. For example, an Electrically Erasable and Programmable (EEP) ROM can be used.

Note that the program for the communication terminal is a file in an installable or executable format, and can be recorded in a computer readable recording medium such as the recording medium 106 so that the file is distributed.

The management system 50 centrally manages the communication terminals 10A and 10B, and the relay unit 30, and manages the session between the communication terminals 10A and 10B. Specifically, the management system 50 receives a request for the start of a communication from the communication terminal 10, and performs session control for connecting the communication terminal 10 and the relay unit 30 to enable connection to the communication terminal 10 that is the communication destination via the relay unit 30.

Figure 17:
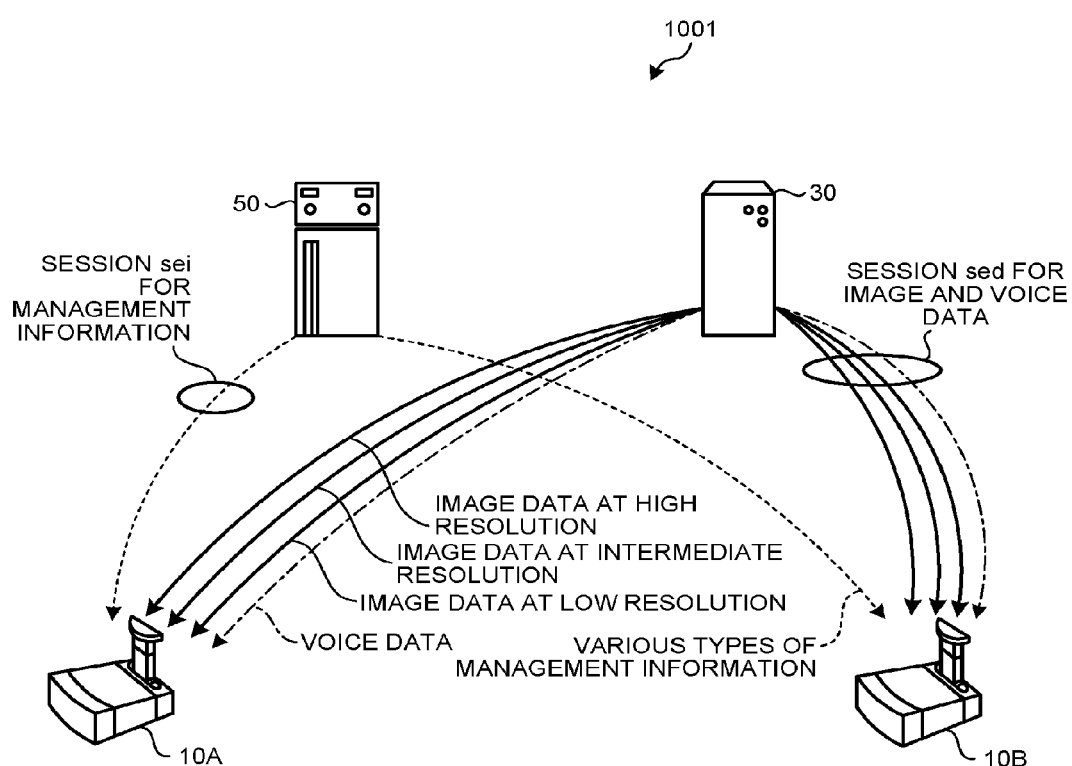
FIG. 17 is an explanatory diagram of the concept of transmission and reception of image data, voice data, and various types of management information in the transmission system.

FIG. 17 is an explanatory diagram of the concept of the transmission and reception of image data, voice data, and various types of management information in the transmission system 1001. In this example, the image data, voice data, and various types of management information correspond to the communication data described above. However, the communication data is not limited to the image data, voice data, and various types of management information. As described above, the communication data can be the data including at least any one of an image, a voice, and a document. As illustrated in FIG. 17, a session sei for the management information is established between the communication terminal 10A and the communication terminal 10B via the management system 50 in the transmission system 1001 in order to transmit and receive various types of management information. Four sessions are established between the communication terminal 10A and the communication terminal 10B via the relay unit 30 in order to transmit and receive four types of data, image data at a high resolution, image data at an intermediate resolution, image data at a low resolution, and voice data. In the drawing, the four sessions are collectively illustrated as a session sed for the image and voice data.

An embodiment provides an effect that the communication quality of the transmission system can be estimated without performing a communication with another user in the transmission system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable medium containing an information processing program, the program, when executed by a computer, causes the computer to perform a method comprising:

calculating a highest effective transfer rate by communicating with a communication quality check server via a network;

calculating delay information indicating a communication delay in communicating with the communication quality check server via the network;

estimating a lowest effective transfer rate based on the highest effective transfer rate and the delay information; and displaying, on a display, communication quality information indicating an effective bandwidth whose upper limit is the highest effective transfer rate and whose lower limit is the lowest effective transfer rate.

2. The computer-readable medium according to claim 1, wherein the second calculating step comprises calculating a communication delay time multiple times by communicating with the communication quality check server via the network, and
the delay information is one of a longest communication delay time, a shortest communication delay time, a difference between the longest communication delay time and the shortest communication delay time, and a standard deviation of the measured communication delay times.

3. The computer-readable medium according to claim 2, wherein the second calculating step comprises exchanging data with the communication quality check server via the network multiple times and measuring the communication delay time every time the data is transferred.

4. The computer-readable medium according to claim 2, wherein the second calculating step comprises exchanging data with the communication quality check server via the network and measuring the communication delay time every time a packet constituting the data is exchanged.

5. The computer-readable medium according to claim 1, wherein the first calculating step comprises calculating the highest effective transfer rate by communicating with the communication quality check server via the network in Transmission Control Protocol (TCP) communication.

6. The computer-readable medium according to claim 1, wherein the first calculating step comprises calculating the highest effective transfer rate and a rate of packet loss by communicating with the communication quality check server via the network in User Datagram Protocol (UDP) communication, and
the estimating step comprises estimation the lowest effective transfer rate based on the highest effective transfer rate, the delay information, and the rate of packet loss.

7. The computer-readable medium according to claim 1, wherein the first calculating step comprises measuring at least one of a highest effective transmission rate and a highest effective reception rate as the highest effective transfer rate,
the estimating step comprises estimating at least one of a lowest effective transmission rate and a lowest effective reception rate as the lowest effective transfer rate, and
the communication quality information is at least one of an effective transmission bandwidth whose upper limit is the highest effective transmission rate and whose lower limit is the lowest effective transmission rate, and an effective reception bandwidth whose upper limit is the highest effective reception rate and whose lower limit is the lowest effective reception rate.

8. A communication quality estimation method, the method comprising:
calculating a highest effective transfer rate by communicating with a communication quality check server via a network;
calculating delay information about communication delay by communicating with the communication quality check server via the network;
estimating a lowest effective transfer rate based on the highest effective transfer rate and the delay information; and
displaying, on a display, communication quality information indicating an effective bandwidth whose upper limit is the highest effective transfer rate and whose lower limit is the lowest effective transfer rate.

9. An information processing apparatus, comprising:
processing circuitry configured to
calculate a highest effective transfer rate by communicating with a communication quality check server via a network;
calculate delay information indicating a communication delay by communicating with the communication quality check server via the network;
estimate a lowest effective transfer rate based on the highest effective transfer rate and the delay information, the lowest effective transfer rate being lower than the highest effective transfer rate; and
causing a display to display communication quality information indicating an effective bandwidth whose upper limit is the highest effective transfer rate and whose lower limit is the lowest effective transfer rate.

10. A communication quality estimation system, the system comprising:
the information processing apparatus according to claim 9; and
the communication quality check server.

11. The information processing apparatus of claim 9, wherein the processing circuitry is further configured to cause the display to display the communication quality information without establishing a communication session with another information processing apparatus.

12. The computer-readable medium according to claim 6, wherein the first calculating step comprises receiving, from the communication quality check server, information on a total number of packets that the communication quality check server has received, and subtracting the total number of packets that the communication quality check server has received included in the information received from the communication quality check server, from the total number of packets that have been transmitted, to calculate the rate of packet loss.

13. The computer-readable medium according to claim 7, wherein when TCP communication is used in calculating the highest effective transmission rate, the estimating step comprises estimating the lowest effective transmission rate from a first expression:

$$\text{lowest effective transmission rate} = Ae^c,$$

wherein A is a value obtained by multiplying the highest effective transmission rate by a corrective coefficient, e is an exponential function, and C is the delay information; and
when UDP communication is used to calculate the highest effective transmission rate, the estimating step comprises estimating the lowest effective transmission rate from a second expression:

$$\text{lowest effective transmission rate} = A/(Bc)$$

or a third expression:

$$\text{lowest effective transmission rate} = Ae^{Bc},$$

wherein B is a value obtained by multiplying a rate of packet loss by a corrective coefficient, and c is the standard deviation in a plurality of communication delay times.

14. The computer-readable medium according to claim 7, wherein when TCP communication is used to calculate the highest effective reception rate, the estimating step comprises estimating the lowest effective reception rate from a first expression:

$$\text{lowest effective reception rate} = A'e^c$$

wherein A' is a value obtained by multiplying the highest effective reception rate by a corrective coefficient, e is an exponential function, and C is the delay information; and when UDP communication is used to calculate the highest effective reception rate, the estimating step comprises estimating the lowest effective reception rate from a second expression:

lowest effective expression rate=$A'/(Bc)$, or a third expression:

lowest effective reception rate=$A'e^{Bc}$ wherein B is a value obtained by multiplying a rate of packet loss by a corrective coefficient, and c is the standard deviation in a plurality of communication delay times.

* * * * *